(12) United States Patent
Listou

(10) Patent No.: US 8,321,475 B2
(45) Date of Patent: *Nov. 27, 2012

(54) SYSTEM AND METHOD FOR CONTEXTUAL DATA MODELING UTILIZING TAGS

(75) Inventor: Robert Eugene Listou, Falls Church, VA (US)

(73) Assignee: Execware, LLC, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,403

(22) Filed: Feb. 27, 2012

(65) Prior Publication Data

US 2012/0159304 A1 Jun. 21, 2012

Related U.S. Application Data

(63) Continuation-in-part of application No. 13/288,451, filed on Nov. 3, 2011, which is a continuation-in-part of application No. 13/216,834, filed on Aug. 24, 2011, which is a continuation of application No. 12/369,070, filed on Feb. 11, 2009, now Pat. No. 8,010,549.

(51) Int. Cl.
*G06F 17/30* (2006.01)
(52) U.S. Cl. ........ 707/805; 707/917; 715/810; 715/853; 715/227
(58) Field of Classification Search .................. 707/805, 707/917, 999.007; 715/227, 810, 853
See application file for complete search history.

(56) References Cited

U.S. PATENT DOCUMENTS

| | | | | |
|---|---|---|---|---|
| 6,976,020 | B2 * | 12/2005 | Anthony et al. | 1/1 |
| 7,689,579 | B2 * | 3/2010 | DeMesa et al. | 707/999.102 |
| 7,698,292 | B2 * | 4/2010 | DeMesa et al. | 707/999.102 |
| 8,219,555 | B1 * | 7/2012 | Mianji | 707/736 |
| 2003/0069908 | A1 * | 4/2003 | Anthony et al. | 707/513 |
| 2005/0143969 | A1 * | 6/2005 | DeMesa et al. | 703/22 |
| 2005/0144154 | A1 * | 6/2005 | DeMesa et al. | 707/1 |
| 2010/0083173 | A1 * | 4/2010 | Germann et al. | 715/810 |
| 2012/0079362 | A1 * | 3/2012 | Listou | 715/227 |

* cited by examiner

*Primary Examiner* — Jean M Corrielus
(74) *Attorney, Agent, or Firm* — Tarek N. Fahmi, APC

(57) ABSTRACT

Sorting and displaying data objects is facilitated by displaying a collection of tags, each representing a respective data object, and each including identifying information for its respective data object. The organization of the tags with respect to one another is correlated with the organization of the data objects. Responsive to user input, the tags are displayed in a specified arrangement, and a new tag and an associated new data object associated with the new tag are created. A user is permitted to specify parameter values for the new data object, which is added to the existing data objects at a location that corresponds to a location of the new tag within the organization of the tags. The new data table thus includes the new data object arranged in order with the previous data objects as determined by the organization of the tags and the new tag.

7 Claims, 5 Drawing Sheets

| | File | Query | Item | Mark | Tools | Help | | | | | |
|---|---|---|---|---|---|---|---|---|---|---|---|

Figurines — All

Clay 12-24"

Black/Brown

Grid

| Grid | Depth | Color | Material | Object | Item |
|---|---|---|---|---|---|
| 3 | 15 | Black | Wood | Box | 18 |
| 8 | 5 | Blue | Clay | Bowl | 12 |
| 8 | 6 | Gray | Stone | Figurine | 5 |
| 9 | 6 | Gray | Stone | Figurine | 10 |
| 10 | 19 | Gray | Clay | Bowl | 23 |
| 10 | 21 | Gray | Metal | Box | 24 |
| 11 | 6 | Brown | Wood | Figurine | 20 |
| 13 | 9 | Black | Stone | Knife | 3 |
| 17 | 4 | Gray | Clay | Bowl | 14 |
| 18 | 5 | Blue | Clay | Plate | 15 |
| 19 | 8 | Gray | Stone | Hammer | 22 |
| 19 | 9 | Green | Clay | Bowl | 13 |
| 19 | 16 | Brown | Metal | Bowl | 19 |

FIG. 1

SYSTEM AND METHOD FOR CONTEXTUAL DATA MODELING UTILIZING TAGS

CROSS-REFERENCE TO RELATED APPLICATIONS

This application is a CONTINUATION-IN-PART of U.S. patent application Ser. No. 13/288,451, filed Nov. 3, 2011, incorporated herein by reference, which is a CONTINUATION-IN-PART of U.S. patent application Ser. No. 13/216,834, filed Aug. 24, 2011, incorporated herein by reference, which is a CONTINUATION of U.S. patent application Ser. No. 12/369,070, filed Feb. 11, 2009, now U.S. Pat. No. 8,010,549.

FIELD OF THE INVENTION

This invention relates to the field of information processing and display by computers, particularly to an analytic methodology by which new queries to be run against datasets are defined and executed, and the results thereof displayed for the user's combinatorial reasoning and manipulation.

BACKGROUND OF THE INVENTION

Contextual data modeling (CDM) is a systemized form of computer-aided morphological analysis that deals with concrete items in an orderly way in which no interrelations of the names and parameter values of text data objects on a data table are ignored a priori as being unimportant. Text data items analyzed using CDM include any type of objects or events with unique identifying names or numbers plus parameters such as weight, nationality, material, location, date, age, etcetera. It will be apparent that "things" or "items" exist in many fields of investigation, analysis, and management that can be listed in data tables and that many interrelations are possible.

The concept of CDM is analogous to modern technology installed in the instrument panels of aircraft. Data formerly displayed to pilots on a variety of separate instruments displaying one variable, for example artificial horizon, direction, altitude, climb rate, speed, fuel, etc., can now be displayed to pilots as computer-produced imagery in a single screen on the instrument panel. That practice and CDM are both intended to consolidate on a currently viewed computer monitor or, optionally in CDM, several monitors, as much relevant data as possible to aid the viewer in reasoning about next steps. In CDM software, the data relate to a set of text data objects and associated graphic images. The design criteria for the graphical user interface (GUI) of CDM software are fourfold, as follows. One, all permutations of automated CDM data tables must be examined to ensure that no important interrelations are overlooked; two, processes must maximize real time operation in view of, as taught by cognitive science, the limited duration in human working memory of currently viewed data about which the software user is reasoning; three, the user should have immediately available, preferably imaged concurrently, as much information as possible about items being examined; and, four, the user must be able to rapidly edit viewed data to reflect her or his reasoning and, if desired, add color to text and/or backgrounds for later reference.

SUMMARY OF THE INVENTION

In one embodiment of the invention, sorting and displaying a plurality of data objects is facilitated by displaying, responsive to a user query, a collection of tags, each of the tags representing a respective data object of a number of data objects responsive to the query, each data object having associated values of one or more parameters, and each of the tags including identifying information for its respective data object, wherein an organization of the tags with respect to one another is correlated with an organization of the data objects. The tags may be displayed in an arrangement specified by user input. Responsive to further user input, a new tag and an associated new data object associated with the new tag are created. The user is permitted to specify data elements and parameter values for the new data object, and the new data object is added to the number of data objects responsive to the query at a location within the organization of the data objects that corresponds to a location of the new tag within the organization of the tags. The user is then presented with a new data table that includes the new data object arranged in order with the data objects responsive to the query as determined by the organization of the tags and the new tag.

The present method may include displaying a data table including the data objects responsive to the query concurrently with the tags representing the data objects responsive to the query. The tags may be organized in a tag screen and said tag screen may include user-manipulable controls for manually or automatically repositioning a placement of a tag in the tag screen and thereby automatically repositioning a placement of a data object correlated with the repositioned tag within the data table. The concurrent display of the data table and the tags may be via a single display unit, for example a single touch-screen display unit. A user may be afforded the opportunity to reposition data objects included in the data table and/or tags by executing a touch or a gesture on the touch-screen display unit.

BRIEF DESCRIPTION OF THE DRAWINGS

The present invention is illustrated by way of example, and not limitation, in the figures of the accompanying drawings, in which:

FIG. 1 depicts a data table specifying text data objects and values for identified parameters assigned to the text data objects;

DETAILED DESCRIPTION

Figure 2:
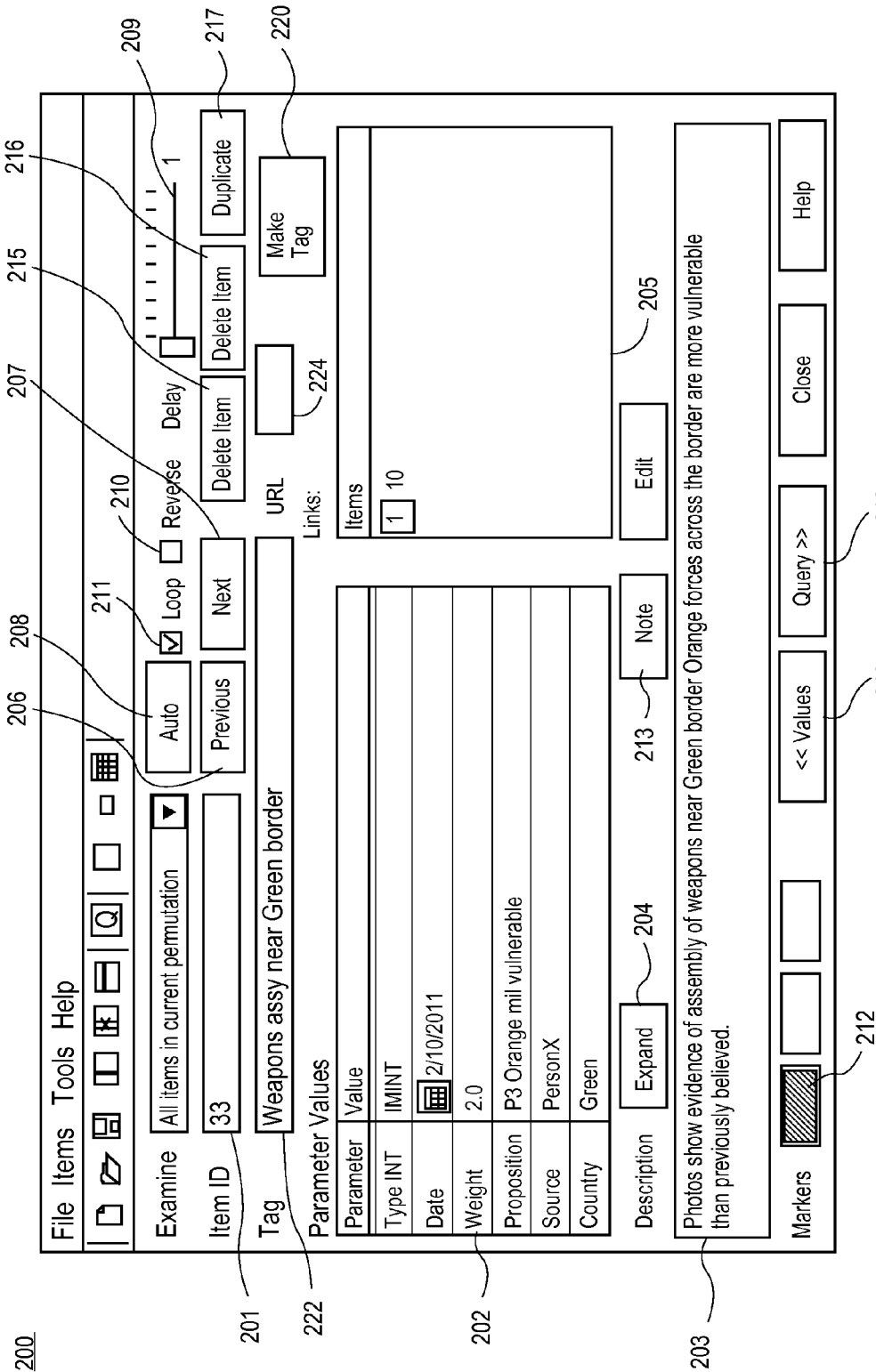
FIG. 2 is an integrated dialog box, called the item screen, imaged by selecting an item name or data object on the data table depicted in FIG. 1.

Described herein are methods and systems for information processing and, particularly for use in connection with an analytic methodology for defining and executing search queries and presenting the results thereof for user analysis. The present methods and systems allow for computer-aided morphological analysis of a set of text data objects and associated graphic images, allowing a user to uncover meaningful interrelations of data objects (e.g., text data objects) organized in a data table through the manipulation of tags that represent at least some of the data objects. Such manipulations result in the definition of new queries to be run against modified datasets in order to produce consolidated files (e.g., text files). Display of various item screens and tags may be concurrent and coordinated with display of the data objects in the data table. Near real time operation may serve to optimize retention of perceived data in the computer user's short term working memory as reasoning leads to modeling (manipulating) the data, including editing and colorization, until the user's reasoning is reflected in the displayed data.

It will be apparent to the reader that embodiments of the present invention are intended to be practiced with and on one or more computer systems. Accordingly, various embodiments of the present invention may be implemented with the aid of computer-implemented processes or methods (a.k.a. programs or routines) that may be rendered in any computer-executable language. In view of the above, it should be appreciated that some portions of the description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. Unless specifically stated otherwise, it will be appreciated that throughout the description of the present invention, use of terms such as "processing", "computing", "calculating", "determining", "displaying" or the like, refer to the action and processes of an appropriately programmed computer system, or similar electronic computing device, that manipulates and transforms data represented as physical (electronic) quantities within the computer system's registers and memories into other data similarly represented as physical quantities within the computer system memories or registers or other such information storage, transmission or display devices.

The computer systems with and on which embodiments of the present invention can be implemented may be specially constructed for the required purposes or may comprise a computer system that is selectively activated or reconfigured by a computer program which it executes and which is stored on one or more computer-readable storage mediums accessible to processing elements of the computer system. For example, such a computer program may be stored in a non-transitory computer readable storage medium, such as, but not limited to, any type of disk including hard disks, floppy disks, optical disks, compact disk read only memories (CD-ROMs), and magnetic-optical disks, read-only memories (ROMs), flash memories, random access memories (RAMs), erasable programmable read only memories (EPROMs), electrically erasable programmable read only memories (EEPROMs), other forms of magnetic or optical storage media, or any type of media suitable for storing computer-executable instructions, and each accessible to a computer processor, e.g., by way of a system bus or other communication means.

The algorithms and processes presented herein are not inherently related to any particular computer system, processor or other apparatus. Various electronic computing apparatus, along with, where necessary, suitable computer programs that instantiate processes in accordance with the teachings herein, may be used. For example, any of the present methods can be implemented in hard-wired circuitry, by appropriate programming of a computer processor or processors, or a combination of hardware and software may be used to carry out the methods discussed below. Of course, the invention can be practiced with computer system configurations other than those particularly described below, including systems that comprise hand-held devices (e.g., tablets, smart phones, etc.), multiprocessor systems, microprocessor-based electronic devices, digital signal processor-based devices, networked computer systems, minicomputers, mainframe computers, personal computers, and the like, and it should be recognized that these examples presented herein are used merely for purposes of illustration. The invention can also be practiced in distributed computing environments where tasks are performed by computer processing devices that are remote to one another, either physically and/or logically, and are linked through one or more communications networks. The required structure for a variety of these systems will appear from the description below.

By way of non-limiting example, a computer system upon which an embodiment of the invention may be implemented will generally include a bus or other communication mechanism for communicating information, and a processor coupled with the bus for processing information. Main memory, such as a RAM or other dynamic storage device, will be communicatively coupled to the processor and available for storing information and instructions to be executed by the processor. Such main memory also may be used for storing temporary variables or other intermediate information during execution of instructions by the processor. Further, a ROM or other static storage device will be communicatively coupled to the processor for providing stored static information and instructions for the processor and other storage devices, such as a hard disk or flash memory, may be provided and communicatively coupled to the processor for providing stored information and instructions.

The subject computer system will also have one or more displays for displaying information to a computer user. An input device, including alphanumeric and other keys, may also be provided for communicating information and command selections to the processor, although in some instances this may be accomplished through a virtual keyboard rendered on the display. Other user input devices for cursor control, such as a mouse, trackball, joystick, touchpad, or cursor direction keys may be provided for communicating direction information and command selections to processor and for controlling cursor movement on the display.

As will become apparent from the discussion below, the invention is related to the use of a computer system to aid the user in organizing information in ways that reveal meaningful interrelations of data objects. Instructions for performing such operations and displaying results thereof may be stored as sequences of instructions in main memory, static memory or a combination thereof, and may be read from main memory or another computer-readable medium for execution by the processor as needed (e.g., in response to user commands, etc.). Execution of the sequences of instructions contained causes the processor to perform the process steps described below.

The subject computer system may also include a communication interface for providing two-way data communication (e.g., via a local area network (LAN) or other means) to and from the computer system. In any such implementation, the communication interface sends and receives electrical, electromagnetic or optical signals which carry digital data streams representing various types of information. For example, two or more computer systems of the type described herein may be networked together in a conventional manner with each using a respective communication interface to exchange information. In this way, the subject computer system may access data stored remotely and/or provide display information to displays situated remote from the processing unit.

With the foregoing in mind, we turn now to a discussion of the present systems and methods for information processing. FIG. 1 depicts a portion of a data table view screen (100) as may be rendered on a display of the subject computer system described above. It will be appreciated that although the computer systems elements are not shown in detail (so as not to unnecessarily obscure the details of the present invention), all of the display and processing operations discussed herein are preformed by and on the computer system and when actions of a user are discussed it is those actions as are implemented using the computer system. Data table view screen (100) includes a data table view (105) that includes a plurality of data objects (or data items), typically represented by a row in a data table. Each data object is associated with parameter (110) values. On some occasions, a data object may be linked to other information and the link parameter for the data object may be displayed as "yes" or "no," accordingly. When a data object associated with a link is selected, an item screen, such as item screen (200) as discussed below with regard to FIG. 2, may be displayed. Table view (115) indicates subsets of data to be displayed in the data table view (105) that may have been selected from a larger data set. For example, sets of data objects associated with one or more parameter values may be selected for display in data table (105). Further discussion of table view (115) is provided below with regard to FIG. 5.

When the user of the present CDM software instructs the computer system to automatically display, at a speed determined by the user, a sequence of permutations of the data table, the number of such permutations is determined by the number of parameters. For example, a table with 4 parameters can have 24 permutations; with 5 parameters, 120 permutations; with 6 parameters, 720 permutations; and so on. With each new permutation of the table, the vertical and horizontal locations of parameter values and the vertical locations of the object names change location because of the different sort orders of each permutation. Employing a form of combinatorial reasoning, the user of the CDM software may examine some or all possible combinations of parameter values, and differing sequences of names, to find meaningful interrelations, actual or perceived. The user may employ in-place editing and colorization of text and cells to reconcile the data on the table with his or her reasoning. The user may proceed through the various permutations via a manual and/or automatic process that may be user configurable.

Consistent with the objective of enabling the user to simultaneously perceive visually a plurality of sources of data about the items listed in a data table, the CDM concept addresses the item screen (200) illustrated in FIG. 2. Item screen (200) may be used to enter information concerning data objects, from which is selected a dataset for populating the data table, as well as to enter additional data for subsequent reference. Item screen (200) may be displayed when, for example, the user selects a data object displayed in data table view (105). Item screen may include the item name (201), the item's parameters and their values (202), a field for descriptive text (203) that can be expanded by selecting (204) to reveal a large quantity of text comprising more information about the data object than its name and parameter values, optionally including observations entered during previous evaluations of the data object by the user or users. Another field (205) lists other items on the data table that have been selected as related items, the item screens of which can be accessed by selecting their names in this field. At times, multiple item screens (200) for data objects in the data table may be available to the user as a virtual stack of such screens. The user can view them sequentially, for example, in the order the data objects are listed in the data table, in a manual fashion by selecting the Previous (206) or Next (207) buttons, or through an automated sequencing by selecting Auto (208) and specifying a delay interval with a slider control (209). For continued perusal of the item screens the user can also elect to see them in reverse order by selecting the box at (210), and can also cause the sequence to loop by selecting (211). After the Auto mode (208) has been selected, that word on the button is automatically replaced by the word Stop, which can be selected to stop the automated sequencing.

A user rapidly browsing through a virtual stack of item screens can be aided by a visual sorting mechanism. In visual retrieval fields (212), the user can enter any character and/or color in one or all of the fields. The means of entering characters and affixing colors are known to those skilled in the art. While browsing, the user may also wish to enter temporary notes in a dialog box opened by selecting the Note button (213). Later, while sequencing the virtual stack of item screens, contents of the marker fields (212) aid in visual retrieval, and the presence of a note may be indicated when that item screen is displayed through the use of a Note icon or other indicator (e.g., a "Note Attached" indicator preceding button (213)) and/or the playing of an audible sound when the relevant item screen is displayed. The user can manipulate the content of a current virtual stack of items screens (200) by adding a new item (215), deleting a current item being examined (216), or creating a duplicate item (217) when reasoning leads to the wish for a new item that is similar to the one being examined, said duplicate then being edited and renamed.

Responsive to CDM design criteria number two regarding rapid operation, the user may either perform in-place editing or select a value button (218) to open a dialog box with a drop-down list of the current parameters and their values from which a selection can be made. When this item screen is used to enter data for the final item to be listed on the data table, the user may select a query button (219) to image an integrated dialog box, as discussed in U.S. Pat. No. 6,216,139, in which the desired select and sort criteria are entered.

On some occasions, a representation of a data object as a tag may be desired. For example, a tag may serve as a shortcut to accessing information related to the data object associated with the tag. A user may associate a tag with a data object depicted in item screen (200) via, for example, entering content for the tag into tag field (222) and/or selecting a make tag button (220). Tag field (222) may be expandable to accommodate text entry as needed. In one embodiment, the user may enter text into tag field (222) and selection of make tag button (220) may create a tag using the text so entered and/or item ID (201). The resulting tag (300) may be displayed in a tag screen (404) as discussed below with regard to FIGS. 3 and 4, respectively.

The contents of a tag may be manually or automatically determined and may include, for example, alpha-numeric characters, images, and/or graphic elements. In some instances, the user may create a tag using an ad hoc or informal phrase to identify, for example, a data object or relationship between data objects. On some occasions, a tag may be automatically created following selection of make tag button (220) without further user input and a title for the tag may be automatically created and displayed in a tag field (222).

In some embodiments, item screen (200) may include a URL dialog box 224 into which a file address or URL may be entered that may enable a user to access, display, or play a data file (e.g., a document, photograph, map, audio file, or IP address) associated with the subject data object and/or tag. A URL's association with item screen (200) may in fact be indicated by a tag, such as tag (300), via a tag type indicator, such as tag type indicator (320) depicted in FIG. 3. Once created, any available means may be employed to delete a tag. Optionally, a report including tags and other associated information may be generated and provided to the user at, for example, the user's request.

Figure 3:
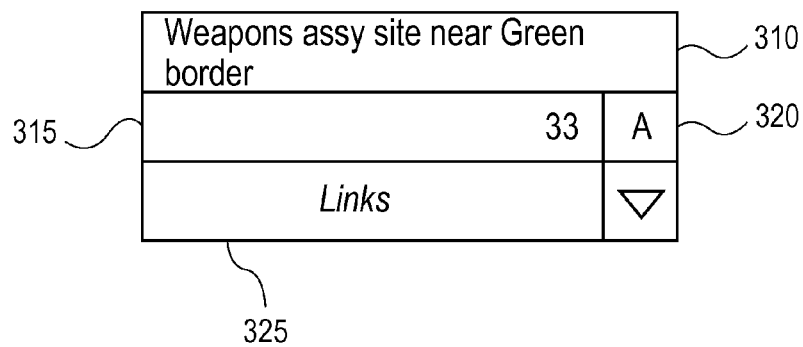
FIG. 3 depicts exemplary tags for data objects included in the data table shown in FIG. 1.

An exemplary tag (300) is depicted in FIG. 3. Tag (300) may include tag text (310) that succinctly states the essence of the associated data object and a data object ID (315). Data object ID (315) may be, for example, a series of alphabetical and/or numeric characters that indicate identification information for an associated data object. In some cases data object ID (315), may be similar, or identical, to the item parameter displayed in data table view (105) for the associated data object and/or the item ID (201) displayed on item screen (200) for the associated data object. On some occasions, selection of data object ID (315) initiates display of, for example, a data object, a data table, and/or item screen (200) associated with tag (300). A single tag may, in some cases, be associated with more than one data object.

Tag (300) may also include a tag type indicator (320) that indicates the existence and type of accessible data file that is associated with a respective data object from the data table. For example, tag type indicator (320) may indicate that the data object associated with the tag and/or a data file associated with the data object is an image file, an audio file, a document file, a web file or a combination of various ones of the foregoing. In some embodiments, tag type indicator (320) may act as a link to data files and/or data object(s) associated with tag (300) such that selection of tag type indicator (320) opens the associated data file(s)/object(s). Selection of links button (325), for example via a touch or gesture when using a touch screen or similar display device, may initiate display of information associated with and/or linked to the data object(s) associated with tag (300).

Figure 4:
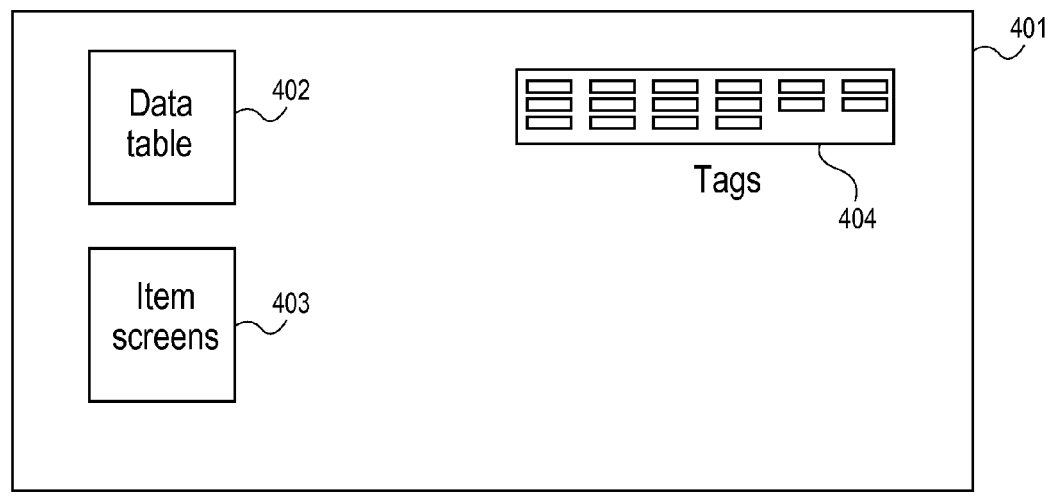
FIG. 4 depicts the simultaneous display of a data table, an item screen, and a group of tags associated with text data items listed in the data table.

CDM design criterion number four calls for enabling the user to perceive simultaneously a plurality of sources of data about the items listed in a data table. The present invention accommodates this requirement by allowing the concurrent display of data tables, item screens and/or tags associated with various ones of the data objects in the data table. FIG. 4 depicts such an example. As shown, a data table (402), associated item screen(s) (403), and a collection of tags may be provided within a single display environment (401) (e.g., as may be rendered on one or more displays available to a user). The data table, item screen(s) and tags may be rendered in individual windows or within a common window, or various combinations of same. The tags may be arranged in a table or grid-like fashion (referred to herein as a tag screen (404)), as shown, but this need not necessarily be true. The tags may be similar to tag (300), discussed above, data table (402) may be similar to data table (100), and items screens (403) may be similar to item screen (200).

The array or other assembly of tags provided in tag screen (404) provides an alternative visual representation of the data objects than is provided by data table (402). This visual representation may enable a user to perceive relationships among the tags and/or associated data objects that is not readily apparent from the view provided by the data table. The relative location of a subject tag (vis-à-vis the other tags) within the array or assortment of tags provided in tag screen (404) may be determined by the corresponding location of the data object associated with the subject tag (vis-à-vis the other corresponding data objects) within data table (402). In some embodiments, a shape or dimension of the array of tags may be adjusted by adjusting the borders of tag screen (404). For example, the borders of an array of twenty tags may be adjusted to provide an array of tags that includes four columns and five rows of tags or two columns and ten rows of tags. The tag screen may further include user-manipulable controls for manually or automatically repositioning placement of tags in the tag screen and thereby automatically repositioning corresponding data objects within the data table. Thus the organization of tags (in a tag screen (404) or otherwise) affords the user a view of the data objects which is readily understandable and manipulable. Like the aircraft displays discussed above, which seek to present a complex set of information to pilots in an understandable, comprehensive fashion, the organization of the tags can assist the user by bringing together a complex set of data objects, each distilled to its essential characteristics, and presented alongside one another in order to allow the user to comprehend their interrelationships in a quick and meaningful way. Further, because the tags can be rapidly and easily rearranged with respect to one another, the user is provided the opportunity to alter the view of the data objects to suit his or her needs, whims or curiosity and thereby to explore potential new relationships among the data objects as reveal themselves through these new view. Such opportunities for aiding human understanding of complex interrelationships of data objects is at the crux of CDM It will be apparent that arrangement of data table 402, item screen(s) (403) and tag screen (404) with respect to one another within the single display environment (401) can be altered from that shown in FIG. 4. Indeed, the relative locations of these items with respect to one another may be determined automatically by the computer system (e.g., subject to criteria for user viewing convenience, the available screen area of a display unit, and other factors) and/or may be determined manually by a user.

As mentioned above, the position of a tag within tag screen (404) may be correlated with the position of an associated data object within a data table such that when a tag is repositioned (relative to other tags) within tag screen (404), the associated data object may likewise be repositioned (with respect to other data objects) in the data table in a manner representative of the tag's new position within tag screen (404) (vis-à-vis the other tags). Likewise, when a subject data object is repositioned (with respect to other data objects) within the data table, for example, during a sequential permutation or otherwise, a tag associated with the subject data object may likewise be repositioned (vis-à-vis the other tags) in a manner representative of the subject data object's new position within the data table (vis-à-vis the other data objects). In this way, a user may simultaneously view the permutations of data objects within the data table (402), information displayed on associated item screens (403), and the relative positions of tags within the tag screen (404). In some embodiments, the single display environment (401) may be or include an interactive screen, such as a touch-screen and the user may be able to interact with the data table (402), item screen(s) (403) and tags within the tag screen (404) by executing a touch or a gesture on the touch-screen display unit.

Note that in some cases, the tags may be decoupled (e.g., via user selection or as a matter of program preferences, etc.) from their respective data objects in the data table, such that when tags are repositioned with respect to one another in tag screen (404), the associated data object(s) are not automatically repositioned within the data table. This may be useful where users want to make a quick examination of a few different organizations of data objects, but not disturb a carefully ordered permutation thereof within the data table. Alternatively, or in addition, in some embodiments the data table permutations can be saved so that if tag repositioning does result in reordering of data objects in a data table, the user can quickly revert to the desired permutation of that data table.

Above, it was noted that tags an be created from the item screens. The item screen includes user-manipulable controls for manually or automatically repositioning a data item in the data table (and thereby automatically repositioning a tag correlated with the repositioned data item within the tag screen). Alternatively, or in addition, a tag may be created by user interaction with tag screen (404). For example, a user may initiate creation of a tag by touching or otherwise selecting an area within the tag screen (404) and thereby initiate display of a blank tag into which the user can enter information for the tag. Further, tag screen (404) may be modified when the user selects, deselects, or deletes tags. On some occasions, modification of tag screen (404) may result in reorganization of the associated data objects in data table (402) or item screens (403).

Figure 5:
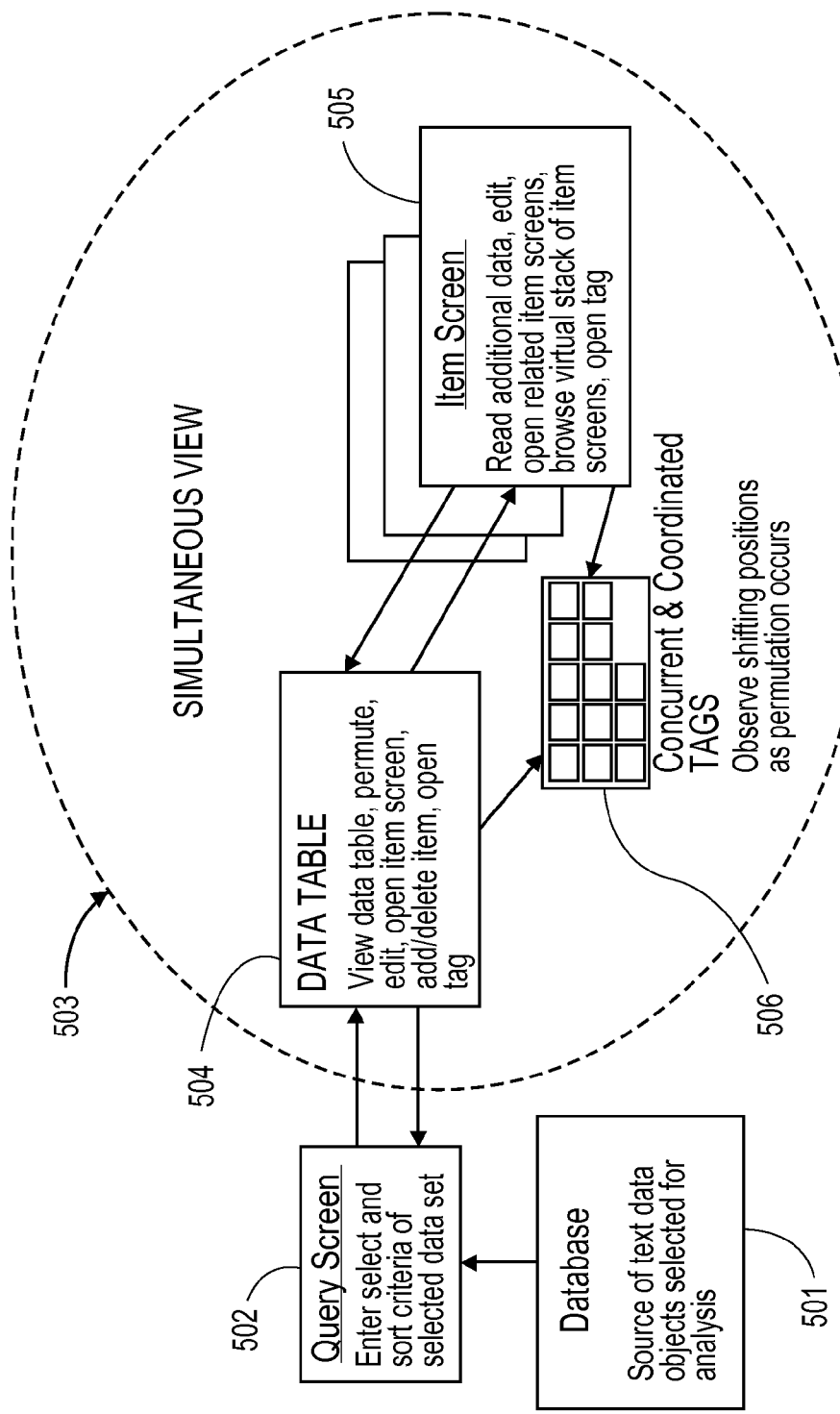
FIG. 5 depicts simultaneous viewing of a data table, a virtual stack of item screens, and tags associated with data objects listed in the data table.

FIG. 5 adds brief summaries of user operations and encloses the three elements of FIG. 4 in a dotted oval. In FIG. 5, a database (501) contains all records of text data objects from which the user can create a derivative smaller dataset using a query screen (502), as discussed in U.S. Pat. No. 6,216,139, to enter select and sort criteria that define the content of a data table. Examples of smaller data sets are provided in table view (115) as discussed above with regard to FIG. 1. The oval boundary (503), which depicts the same display environment as in FIG. 4 but includes brief summaries of user operations, serves to emphasize the concentration of data made visible concurrently to the user. The query screen (502) could, although not frequently employed while modeling the data, become a fourth element of a concurrent view. The modeling operations of the data table (504) with other CDM elements are depicted with two-way arrows depicting the shifting attention of the user. The item screen (505) has components discussed in both above-cited patents, while the present invention adds a tag screen (506) including a plurality of tags that shift positions as permutations of data objects associated with the tags occur.

Figure 6:
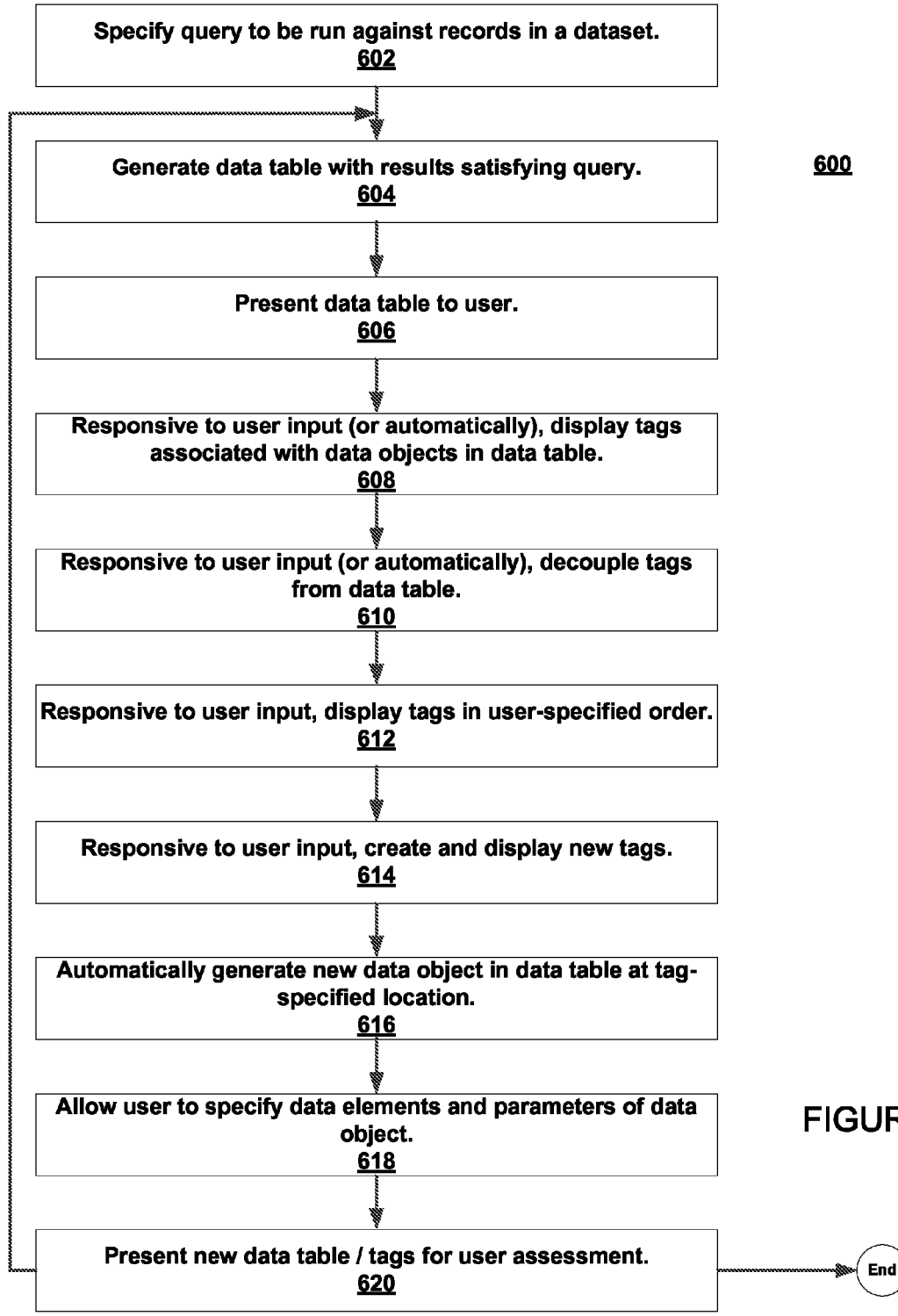
FIG. 6 illustrates a method of defining and executing search queries and displaying the results thereof, in accordance with an embodiment of the present invention.

A further example of the creation of new queries and their execution is described in terms of method 600, illustrated in the flow diagram shown in FIG. 6. At 602, a query is specified by a user and run against records in a dataset. As indicated above, each such record (data object) will have a unique identifier and a number of data elements (parameter values). As a result of the query being executed, a data table is generated 604, and displayed to the user 606. The data table includes those data objects (records) that satisfy the query.

As discussed above, along with the data table, tags representing the data objects may also be displayed 608. This may be done automatically, or in response to appropriate user input (e.g., selecting a "display tags" button on a user interface, etc. in some cases, depending on user preferences, or user input, etc., the tags may be displayed in lieu of the entire data table. This may be especially useful where the query returns large numbers of records (e.g., so many that they become meaningless for the user when organized within a data table). Whether displayed concurrently with or independent of the data table, the tags each include several data elements of the data objects that satisfied the search query. The arrangement of the tags corresponds to the arrangement of the data objects in the data table (note, even if no data table is actually displayed, a virtual such table exists as a result of the query, e.g., in the computer system memory, and so the arrangement of the tags can be made to correspond to the organization of that virtual data table).

The order of the data objects in the data table, and hence the arrangement of the tags, may be dependent upon a sort order specified by the user as part of the query submission, or may be a default order that complies with previously specified user preferences or default settings if no user preferences are specified. For example, in the absence of user preferences, the sort order may be determined based on relevance (as determined by one or more criteria) of the data object to the search query. Alternatively, the sort order may be determined by a time parameter (e.g., newest records first), or another parameter.

In accordance with embodiments of the invention, at 610 the tags are decoupled from their associated data objects in the data table. That is, either automatically, or in response to user input, the user is afforded the opportunity to manipulate the tags on screen and change their respective positions and/or orientations with respect to one another 612, without altering the sort order of the data objects in the data table. By decoupling the tags from the data objects in the data table, computer resources are conserved as a processing unit is spared the task of having to update the display of a data table each time a tag is manipulated. Allowing the tags to be manipulated in this way affords the user significant freedom to review and analyze the information represented by the tags. Users can play out "what if" scenarios by reorienting the tags with respect to one another. Further, and importantly, users can organize tags in multiple different ways to try and visualize different relationships among the data objects.

In some instances, manipulating the tags in this fashion will cause a user to recognize the need for additional information and/or the existence of additional information, and the user may create a new tag as a representation of same. One or more new tags may be created and inserted into positions with respect to other tags responsive to such user input 614. For example, a user may initiate creation of a tag by touching or otherwise selecting an area of the display and thereby initiate display of a blank tag into which the user can enter information for the tag. Further, tags may be modified when the user selects, deselects, or deletes tags. On some occasions, modification of a tag may result in reorganization of the associated data objects in the data table or item screens. The tag content specified by the user thus results in the automated creation of a new data object in the data table with the corresponding information 616. The new data object may be positioned in the data table in a location (vis-à-vis other data objects) corresponding to the position of the newly created tag with respect to other tags, or it may be created at the bottom or top of the data table (e.g., if the tags are presently decoupled from the data table) and placed into a sort order at a later time (e.g., when the tags, in a user-specified order) are re-coupled to their associated data objects).

When the new data object is created, the user may be afforded the opportunity to specify more information (e.g., data elements and associated parameter values) concerning the data object 618. For example, the user may be presented with an information screen for the data object and allowed to fill in one or more fields in the information screen in order to define the data object more completely. Thus, new records are entered in the data table and completed; the resulting data table and tags may be considered the query result for the new dataset and presented to the user 620. Continued modeling (i.e., generating permutations of the dataset) may generate additional queries as well as new tags and the process may continue. As shown, the new dataset may become the target against which new queries are executed and the above-described procedures may continue until the user is satisfied with the results.

The above-described procedures are applicable for use with non-homogeneous items. Examples of such uses may exist in fields such as intelligence analysis, criminal investigation and so on. Data objects in such fields may consist of physical objects, event descriptions, witness statements, credibility assessments, etc. Common parameters include type, date, location, etc. Parameter values may or may not be present. Added tags could be used as placeholders to indicate the need for missing evidence, etc.

In effect, the above-described method allows for definitions of new queries, and modifications of a parent dataset, by adding to the selected data objects (e.g., through creation of new tags), deleting unwanted ones thereof, and presenting the newly resulting selections in a desired sort order. The new datasets allow for future queries, analysis, etc. Users can, optionally, save their results in a single (often text) file, which can be easily disseminated.

In some instances, new datasets may be created directly from new tags. For example, in a blank tag field, users may create new tags and use these new tags to create new data objects in the fashion discussed above. The new data objects (and the new data table that results from their creation) may then be the object of queries, which queries may result in a reduced dataset for further analysis in the fashion discussed above.

Thus, methods and systems for information processing have been described.

What is claimed is:

1. A computer-implemented method for sorting and displaying a plurality of data objects, comprising:

displaying, by a computer system and responsive to a user query, a collection of tags, each of the tags representing a respective data object of a number of data objects responsive to the query, each data object having associated values of one or more parameters, and each of the tags including identifying information for the respective data object, wherein an organization of the tags with respect to one another on a display system of the computer system is correlated with an organization of the data objects;

responsive to user input, displaying the tags on the display system in an arrangement specified by the user input and creating a new tag;

responsive to user input, creating a new data object associated with the new tag, the new data object having associated data elements and parameter values specified by the user, and adding the new data object to the number of data objects responsive to the query at a location within the organization of the data objects that corresponds to a location of the new tag within the organization of the tags; and presenting to the user a new data table which includes the new data object arranged in order with the data objects responsive to the query as determined by the organization of the tags and the new tag.

2. The computer-implemented method of claim 1, further comprising displaying a data table concurrently with the tags representing the data objects responsive to the query.

3. The computer-implemented method of claim 2, wherein the tags are organized in a tag screen and said tag screen includes user-manipulable controls for automatically repositioning a placement of a tag in the tag screen and automatically repositioning a placement of a data object correlated with the repositioned tag within the data table.

4. The computer-implemented method of claim 2, wherein the concurrent display of the data table and the tags is via a single display unit.

5. The computer-implemented method of claim 2, wherein the concurrent display of the data table and the tags is via a single touch-screen display unit.

6. The computer-implemented method of claim 5, wherein a user is enabled to reposition at least one of a data object included in the data table and a tag via executing a touch or a gesture on the touch-screen display unit.

7. The method of claim 1, wherein the tags each comprise a tag text field for information descriptive of the respective data object; a data object identifier field for an identifier of the respective data object; and a tag type indicator field for information indicative of one or more accessible data files associated with the respective data object.

* * * * *